United States Patent
Kurane et al.

(10) Patent No.: US 10,023,244 B2
(45) Date of Patent: Jul. 17, 2018

(54) REAR RAIL BARREL NUT REINFORCEMENT

(71) Applicant: FORD GLOBAL TECHNOLOGIES, LLC, Dearborn, MI (US)

(72) Inventors: Amol Kurane, Farmington Hills, MI (US); Benjamin Lee, Dearborn, MI (US); Richard Edward Pietron, Jr., Plymouth, MI (US); James Royse, Troy, MI (US); Jamie March, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/375,997

(22) Filed: Dec. 12, 2016

(65) Prior Publication Data
US 2018/0162453 A1 Jun. 14, 2018

(51) Int. Cl.
B62D 25/20 (2006.01)
B62D 27/02 (2006.01)

(52) U.S. Cl.
CPC ............ *B62D 25/20* (2013.01); *B62D 27/02* (2013.01); *B60Y 2410/124* (2013.01); *B62D 25/2036* (2013.01)

(58) Field of Classification Search
CPC B62D 25/20; B62D 25/2009; B62D 25/2054; B62D 25/087; B62D 25/2027; B62D 25/2036; B62D 21/09; B62D 21/01; B62D 24/02; B62D 27/023; B62D 27/062; B60Y 2410/124

USPC ................. 296/29, 30, 203.04, 204
See application file for complete search history.

(56) References Cited

U.S. PATENT DOCUMENTS

| 7,178,861 | B2 * | 2/2007 | Yamada | B62D 21/09 296/187.08 |
| 7,198,691 | B2 * | 4/2007 | Ludin | B29C 70/46 156/293 |
| 7,393,015 | B1 * | 7/2008 | Gillespie | B62D 21/11 180/312 |
| 7,631,918 | B2 * | 12/2009 | Yasukouchi | B62D 25/2027 296/30 |
| 7,854,474 | B2 * | 12/2010 | Cox | B62D 25/087 180/312 |
| 9,073,586 | B1 * | 7/2015 | Courtright | B62D 29/008 |
| 9,487,246 | B2 * | 11/2016 | Courtright | B62D 25/2027 |
| 2009/0115224 | A1 * | 5/2009 | Weirup | B62D 21/09 296/203.01 |
| 2012/0286543 | A1 | 11/2012 | Lee | |
| 2015/0166111 | A1 * | 6/2015 | Stojkovic | B62D 24/04 296/35.1 |

FOREIGN PATENT DOCUMENTS

CN 1640750 7/2005
KR 100569994 4/2006

* cited by examiner

*Primary Examiner* — Gregory A Blankenship
(74) *Attorney, Agent, or Firm* — Jason Rogers; Brooks Kushman P.C.

(57) ABSTRACT

A reinforcement assembly for a rear rail of a vehicle is disclosed that includes inner and outer bulwark brackets. The brackets include radially extending walls that are welded to inner and outer walls and a bottom wall of the rear rail. A barrel nut is assembled between the bulwark brackets and retained by the bulwark brackets at an intermediate location between the side walls of the rear rail.

15 Claims, 2 Drawing Sheets

US 10,023,244 B2

REAR RAIL BARREL NUT REINFORCEMENT

TECHNICAL FIELD

The disclosure relates to barrel nut reinforcements for a rear rail of a vehicle.

BACKGROUND

Barrel nut reinforcements are reinforce and connect a rear rail of a vehicle to a sub-frame. The reinforcement retains the barrel nut and reinforces the sidewalls of the rear rail. The reinforcement must meet stiffness requirements and should not unnecessarily add weight.

This disclosure is directed to solving the above problems and other problems as summarized below.

SUMMARY

According to one aspect of this disclosure, a reinforcement is disclosed that comprises an inner bulwark bracket and an outer bulwark bracket attached to opposite sides of a barrel nut. References to inner and outer directions as used herein refer to lateral directions with inner being closer to the longitudinal center line of the vehicle and outer being the direction toward the outer side of the vehicle. The bulwark brackets each include first and second radial walls extending in a vertical plane radially outward from the barrel nut to a weld flange disposed flush to a rear rail wall that extends in a vertical direction.

According to another aspect of this disclosure, a rear rail assembly is disclosed that comprises a rear rail having an inner wall and an outer wall connected by a bottom wall. A barrel nut extends through the bottom wall of the rear rail. Inner and outer bulwark brackets each include first and second radially extending vertical walls connected by a horizontally extending top wall. Each top wall extends from the barrel nut to one of the inner wall and the outer wall.

According to other aspects of this disclosure as they relate to either the reinforcement or rear rail assembly above, the inner and outer bulwark brackets may each further comprise a top web portion, or top wall, interconnecting the first and second radial walls. The top walls extend horizontally between the barrel nut and the side walls of the rear rail.

The first and second radial walls of the inner and outer bulwark brackets may extend from the barrel nut at approximately 90 degree intervals around the barrel nut. Stated in other terms, the walls are disposed at approximately 45 degrees relative to the side walls of the rear rail.

Two rear rail side walls are provided that are connected by a bottom wall. The first and second radial walls may each have a lower edge disposed adjacent the bottom wall with a base weld flange provided on the lower edges that is perpendicular to the respective radial wall and adapted to be welded to the bottom wall.

The base weld flanges may be provided on the same side of the first and second radial walls as the weld flanges on each of first and second radial walls.

The weld flanges may include a front weld flange on a first pair of the radial walls forward of the barrel nut that are adapted to be welded to the rear rail side walls in front of the radial walls. The weld flanges may also include a rear weld flange on a second pair of the radial walls rearward of the barrel nut that are adapted to be welded to the rear rail side walls behind the radial walls.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
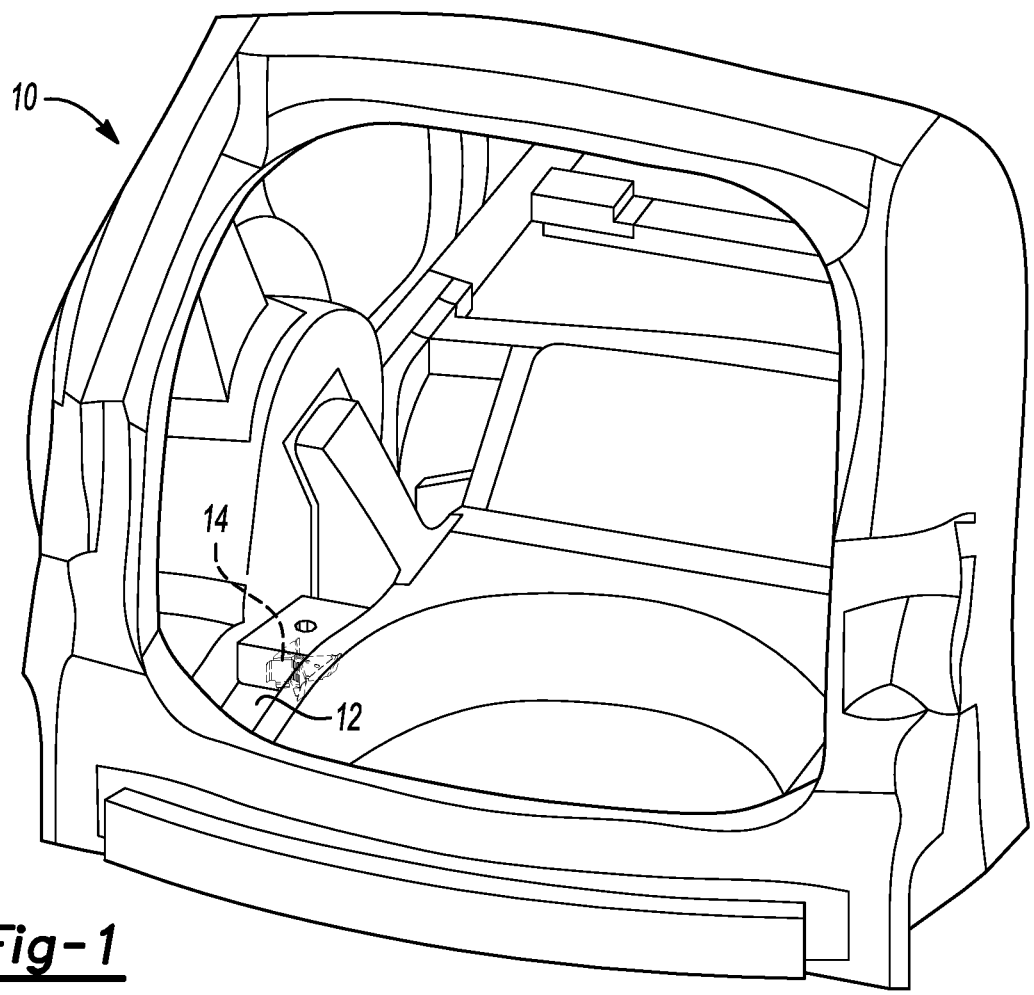
FIG. 1 is a fragmentary perspective view of a rear portion of a vehicle with a lift gate removed.

Referring to FIG. 1, a vehicle 10 is partially shown with the liftgate removed to better show a portion of the rear rail 12 in the area where a reinforcement assembly 14 is installed.

Figure 2:
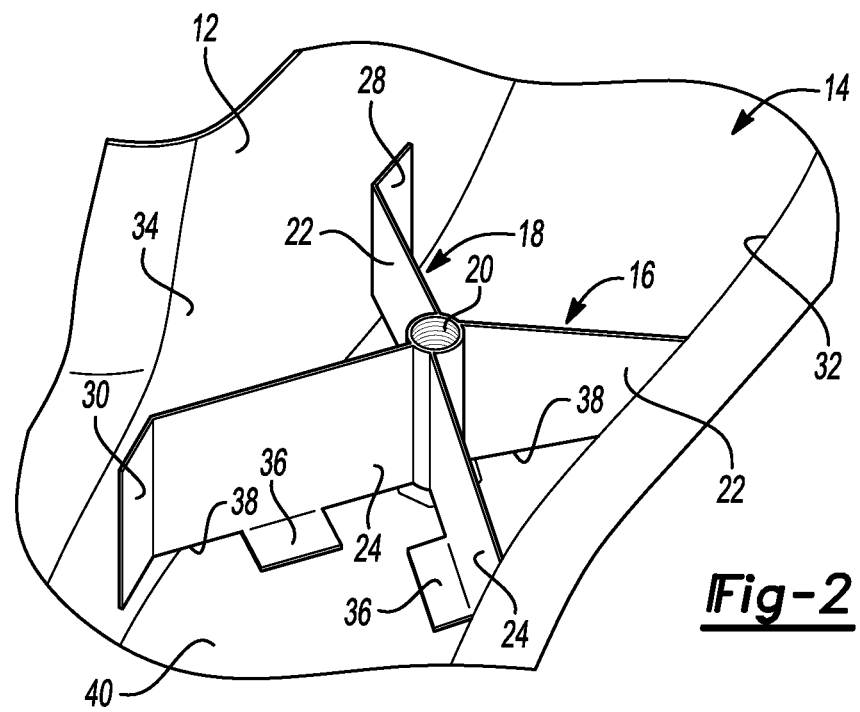
FIG. 2 is a fragmentary perspective view of one embodiment of a barrel nut reinforcement assembly attached to a rear rail of the vehicle.

Referring to FIG. 2, one embodiment of a reinforcement assembly 14 is shown to include an inner V-bracket 16 and an outer V-bracket 18 that are secured to a barrel nut 20 or to a tubular receptacle for a barrel nut 20. Each V-bracket includes a front radial wall 22 and a rear radial wall 24. The radial walls 22, 24 may also be referred to herein as vertical walls. It should be understood that the vertical walls may be at an angle offset plus or minus 10 degrees from a strict vertical direction. A front weld flange 28 and a rear weld flange 30 are provided at the outer ends of the radial walls 22 and 24, and are adapted to be welded to an inner wall 32 or an outer wall 34.

A base weld flange 36 may be provided on a lower edge 38 of each of the radial walls 22, 24. The reinforcement 14 is assembled together as a sub-assembly with the V-brackets 16 and 18 being welded or otherwise secured to the barrel nut 20. The reinforcement assembly 14 is assembled to the rear rail 12. The reinforcement 14 is welded to the rear rail 12 with the front and rear weld flanges 28 and 30 of each of the V-brackets 16, 18 being welded to the inner wall 32 or outer wall 34. The base weld flange 36 of each of the radial walls 22, 24 is welded to a bottom wall 40 of the rear rail 12.

Figure 3:
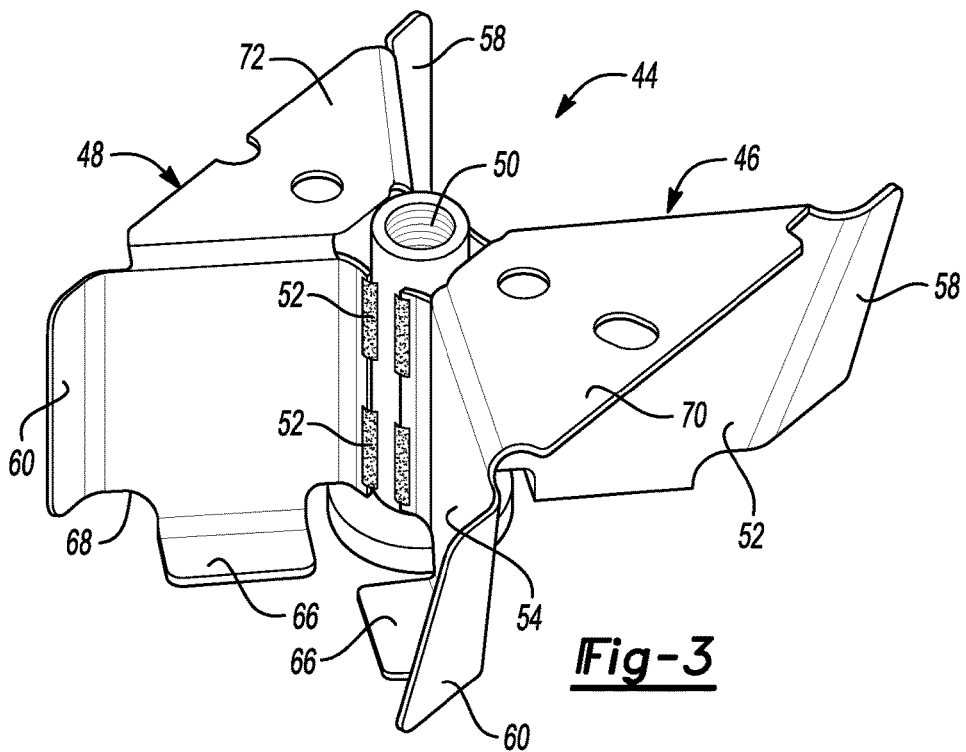
FIG. 3 is a perspective view of an alternative embodiment of a rear rail barrel nut reinforcement.
Figure 4:
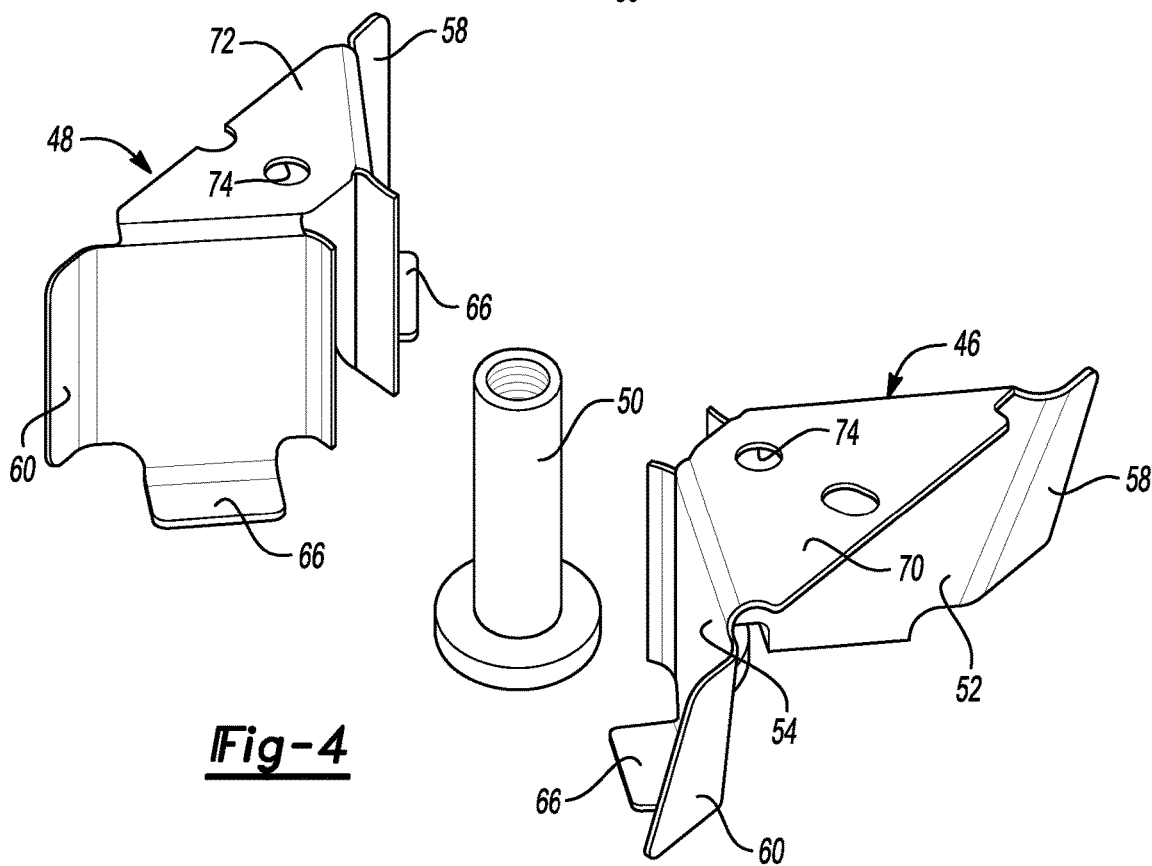
FIG. 4 is exploded perspective view of the rear rail barrel nut reinforcement shown in FIG. 3.

Referring to FIGS. 3 and 4, an alternative embodiment of reinforcement assembly is generally indicated by reference numeral 44. The reinforcement assembly 44 includes an inner bulwark bracket 46 and an outer bulwark bracket 48. The inner and outer bulwark brackets are generally shaped like the corner of a cube that are assembled to opposite sides of a barrel nut 50.

The inner and outer bulwark brackets 46, 48 are welded to the sides of the barrel nut 50 with an arc weld, MIG weld or TIG weld 52. Each of the bulwark brackets 40 and 42 include a front radial wall 54 and a rear radial wall 56 that may also be referred to as vertical walls as previously described with reference to the embodiment of FIG. 2. A front weld flange 58 and a rear weld flange 60 are adapted to be welded to the rear rail 12 as illustrated in the embodiment shown in FIG. 2. The radial walls 54, 56 each include a base weld flange 66 on a lower edge 68. The base weld flange 66 is adapted to be welded to a bottom wall of the rear rail 12 as described with reference to the embodiment of FIG. 2. The welds used to secure the front and rear weld flanges 58, 60 and the base weld flanges 66 to the rear rail 12 are preferably spot, or resistance, welds.

An inner top wall 70 is provided as part of the inner bulwark bracket 46 and an outer top wall 72 is provided as part of the outer bulwark bracket 48. The top walls 70 and 72 extend between the barrel nut 50 and the side walls of the rear rail 12 (shown in FIG. 2). Assembly fixture holes 74 are provided in the top walls 70, 72 to facilitate assembly of the bulwark brackets 46 and 48 to the rear rail 12 (shown in FIG. 2).

While the reinforcement assembly 14 provides a robust reinforcement for the rear rail 12, and offers some weight savings, the embodiment of the reinforcement 44 provides added strength and robustness as a result of the horizontally extending top wall 70 and 72 interconnecting the front and rear radial walls 52, 54. The structure of the inner and outer bulwark brackets 46 and 48 allows the brackets to be made lighter by using a thinner gauge material or lightweight/high strength materials.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A reinforcement comprising:
   an inner bulwark bracket and an outer bulwark bracket attached to opposite sides of a barrel nut, wherein the bulwark brackets each include first and second radial walls extending in a vertical plane radially outward from the barrel nut to a weld flange disposed flush to a rear rail side wall that extends in a vertical direction, wherein the inner and outer bulwark brackets each include a top web portion interconnecting the first and second radial walls, and extend horizontally between the barrel nut and the rear rail side wall.

2. The reinforcement of claim 1 wherein the first and second radial walls of the inner and outer bulwark brackets extend from the barrel nut at approximately 90 degree intervals around the barrel nut.

3. The reinforcement of claim 1 wherein two rear rail side walls are provided that are connected by a bottom wall, wherein the first and second radial walls each have a lower edge disposed adjacent the bottom wall, wherein a base weld flange is provided on the lower edge that is perpendicular to the respective radial wall and adapted to be welded to the bottom wall.

4. The reinforcement of claim 3 wherein the base weld flanges are provided on the same side of the first and second radial walls as the weld flanges on each of first and second radial walls.

5. The reinforcement of claim 1 wherein the weld flanges include a front weld flange on a first pair of the radial walls forward of the barrel nut that are adapted to be welded to the rear rail side walls in front of the radial walls, and wherein the weld flanges include a rear weld flange on a second pair of the radial walls rearward of the barrel nut that are adapted to be welded to the rear rail side walls behind the radial walls.

6. The reinforcement of claim 5 wherein two rear rail side walls are provided that are connected by a bottom wall, wherein the first and second radial walls each have a lower edge disposed adjacent the bottom wall, wherein a base weld flange is provided on the lower edge that is perpendicular to the respective radial wall and is adapted to be welded to the bottom wall.

7. A rear rail assembly comprising:
   a longitudinal rail having an inner wall and an outer wall connected by a bottom wall;
   a barrel nut extending through the bottom wall; and
   inner and outer bulwark brackets each including first and second radially extending vertical walls connected by a horizontally extending top wall, wherein each top wall extends between the barrel nut to one of the inner wall and the outer wall.

8. The rear rail assembly of claim 7 wherein the vertical walls are planar walls extending from the bottom wall to the top walls.

9. The rear rail assembly of claim 7 wherein the vertical walls extend radially from the barrel nut at approximately 90 degree intervals around the barrel nut.

10. The rear rail assembly of claim 7 wherein the vertical walls define a receptacle for the barrel nut between the inner wall and the outer wall.

11. The rear rail assembly of claim 7 wherein the vertical walls have a lower edge disposed adjacent the bottom wall, wherein a base weld flange is provided on the lower edge that is perpendicular to the vertical wall and is welded to the bottom wall.

12. The rear rail assembly of claim 11 wherein the base weld flanges are provided on the same side of the vertical walls as the weld flange on each vertical wall.

13. The rear rail assembly of claim 7 further comprising:
   a front weld flange on each of a first pair of the vertical walls forward of the barrel nut that are adapted to be welded to the inner wall and the outer wall in front of the first pair of vertical walls; and
   a rear weld flange on each of a second pair of the vertical walls rearward of the barrel nut that are welded to the inner wall and the outer wall behind the second pair of vertical walls.

14. The rear rail assembly of claim 13 wherein the rear rail further comprises:
   a bottom wall and the vertical walls have a lower edge disposed adjacent the bottom wall; and
   a base weld flange provided on the lower edge that is perpendicular to the vertical wall and is adapted to be welded to the bottom wall.

15. The rear rail assembly of claim 7 wherein each top wall is attached to two adjacent vertical walls.

* * * * *